(12) United States Patent
Barnes et al.

(10) Patent No.: US 6,950,802 B1
(45) Date of Patent: Sep. 27, 2005

(54) SYSTEM AND METHOD FOR SYSTEMS INTEGRATION

(75) Inventors: Steven D. Barnes, Lansing, NY (US); John R. Cameron, Weybridge (GB); David M. Gerber, Lakeland, FL (US); Eduardo T. Kahan, Longwood, FL (US); Jon M. Boring, Lakeland, FL (US); Christopher A. Newlon, Chapel Hill, NC (US)

(73) Assignee: International Business Machines Corporation, Armonk, NY (US)

(*) Notice: Subject to any disclaimer, the term of this patent is extended or adjusted under 35 U.S.C. 154(b) by 736 days.

(21) Appl. No.: 09/625,108

(22) Filed: Jul. 25, 2000

(51) Int. Cl.$^7$ .............................................. G06F 17/60
(52) U.S. Cl. .............................. 705/7; 705/10; 705/1
(58) Field of Search .................................. 705/7, 10, 1

(56) References Cited

U.S. PATENT DOCUMENTS

| | | | |
|---|---|---|---|
| 6,615,166 B1 * | 9/2003 | Guheen et al. ............... | 703/27 |
| 6,615,199 B1 * | 9/2003 | Bowman-Amuah .......... | 706/50 |

FOREIGN PATENT DOCUMENTS

| | | | | |
|---|---|---|---|---|
| EP | 0397924 A1 * | 5/1989 | ......... | G05B 19/417 |
| JP | 2003345416 A * | 12/2003 | ......... | G05B 19/418 |

OTHER PUBLICATIONS

ACM 0-899791-848-7/96: Proceedings of the Conference with EURO-VHDL '96 and Exhibition on European Design Automation, Sep. 16-20, 1996, Palexpo, Geneva Switzerland: "An Integrated Concept for Design Project Planning and Design Flow Control".

ACM 0-89791-681-6/94/0010: Annual ACM Conference on Systems Documentation Oct. 2-5, 1994, pp 10-16: "A combined project planning model for documentation/traing at BNR".

ACM 0270-5257/88/0000/0049: 10th International Conference on Software Engineering Apr. 11-15, 1988, Singapore pp 49-58: "Integrated Support for Project Management".

IBM TDB Feb. 1990 v 32 n9A p 250-254: "Project Management Environment".

IBM TDB Mar. 1996 v. 39 n 03 p 171-173: "Integration of GroupWare with Project Management via Facilitated Work Sessions".

* cited by examiner

*Primary Examiner*—John Weiss
*Assistant Examiner*—Akiba Robinson-Boyce
(74) *Attorney, Agent, or Firm*—William E. Schiesser; Shelly M Beckstrand

(57) ABSTRACT

A system for providing integrated system solutions includes a set of process descriptions; a set of work product descriptions; and engagement models collecting the process descriptions and work product descriptions into a models for implementing typical projects addressing marketplace requirements. A systems integration method includes the steps of defining an engagement model which will be used to address a market place requirement; utilizing the engagement model to create an engagement template which specifically addresses client requirements within the market place; and measuring, monitoring and controlling client engagements based upon the engagement model.

21 Claims, 9 Drawing Sheets

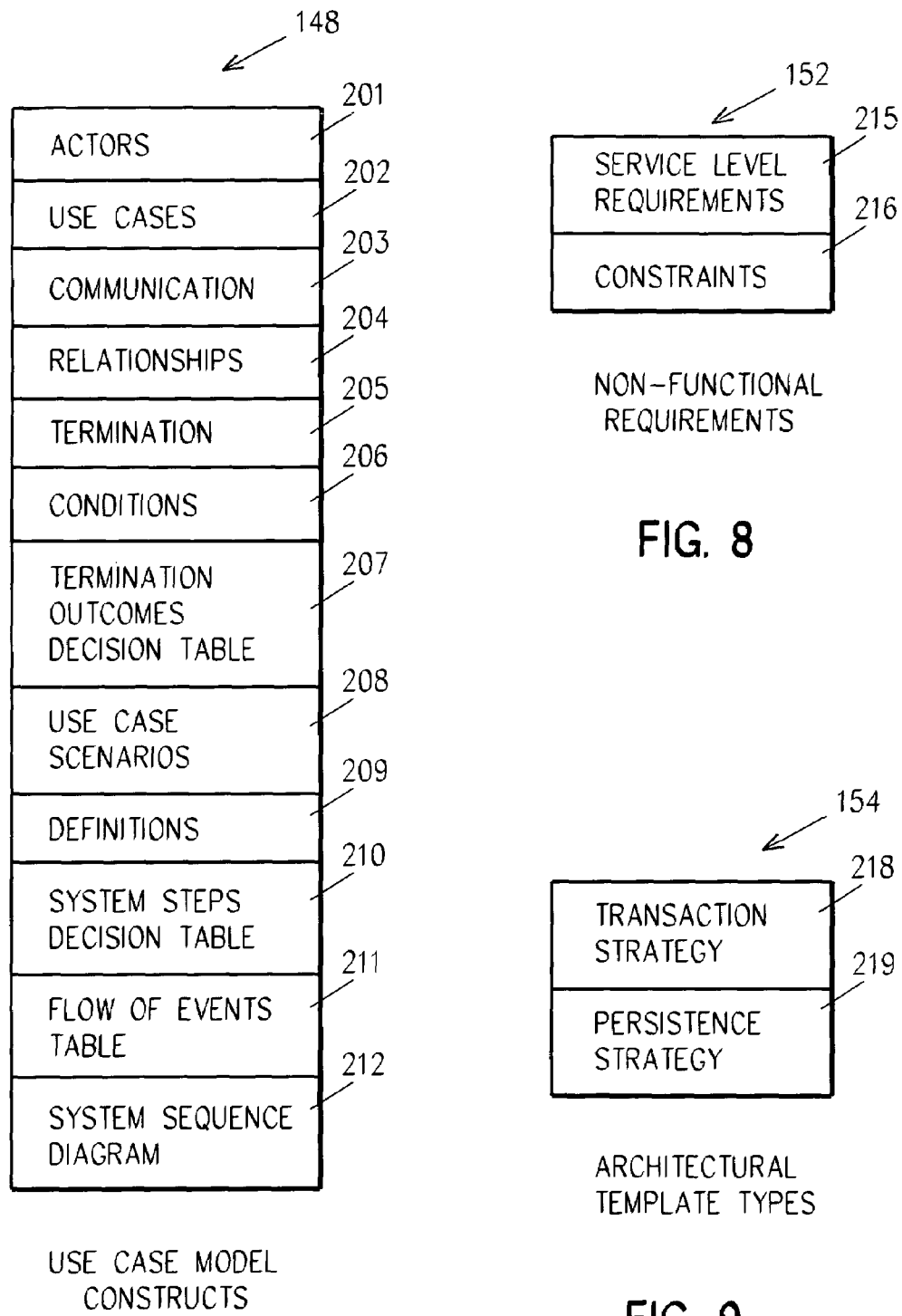

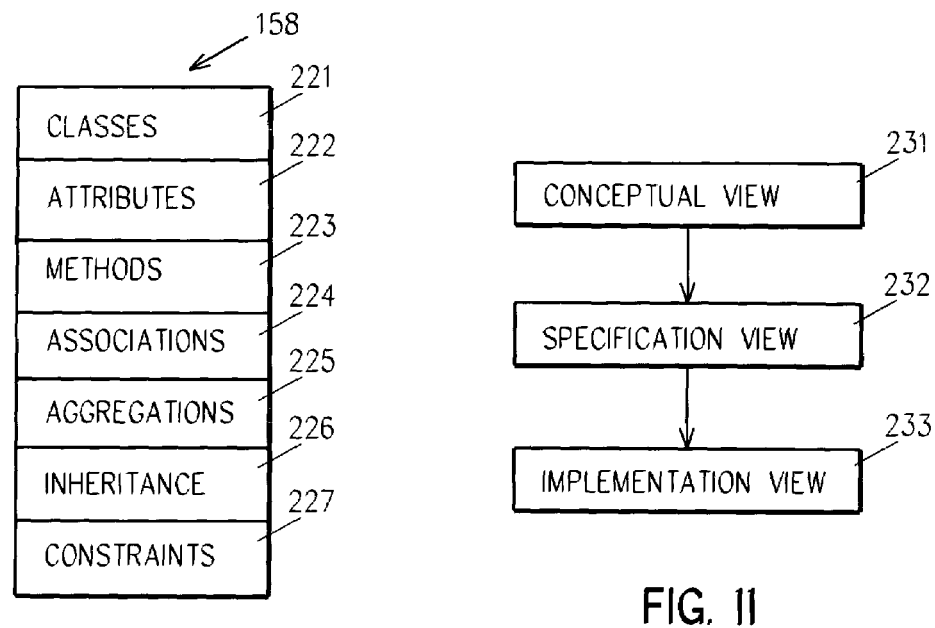
CLASS
DIAGRAM
STRUCTURAL
CONCEPTS
FIG. 10
FIG. 11
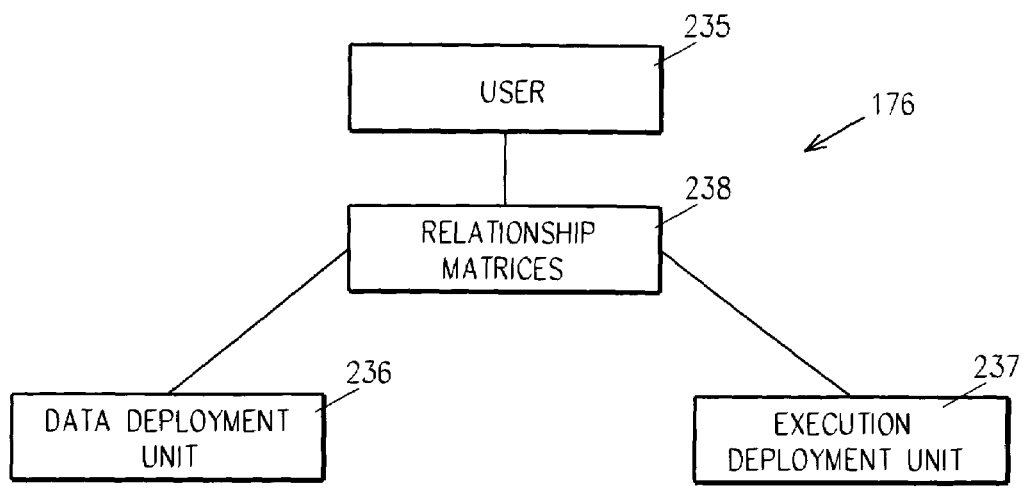
FIG. 12

OPERATIONAL MODEL

SYSTEM MANAGEMENT PLAN

SYSTEM AND METHOD FOR SYSTEMS INTEGRATION

BACKGROUND OF THE INVENTION

1. Technical Field of the Invention

This invention pertains to a system and method for delivering integrated system solutions.

2. Background Art

The standard use of the methodology for system development is very process oriented, and focuses on the "how to" of solution delivery. That is, such methodologies typically provide guidelines and instructions to a development team for developing a system solution. Even when following these guidelines and instructions, different development teams assigned to develop a solution for the same system requirements will invariably develop significantly different solutions.

Stated otherwise, if only system requirements and a standard development process are provided, two development teams, even though working with the same problem, will generate very inconsistent system solutions. Such system solutions are difficult to monitor, manage, and apply to yet different engagements.

Consequently, there is a need in the art for a system development process that will enable consistency of solution design and delivery that span different engagements by different development teams.

It is an object of the invention to provide a system and method for developing coordinated and repeatable approaches used to solve issues and related hypothesis in client engagements.

It is a further object of the invention to provide a system and method for issue resolution based on a work product, as distinguished from the traditional process aspect of other methodologies.

It is a further object of the invention to provide a system and method for issue resolution focused on delivery, as distinguished from the process for delivery.

It is a further object of the invention to provide a system and method for issue resolution which, by focusing on work product, allows specific roles and tasks to be identified during work product development, resulting in manageable plans and assignments.

It is a further object of the invention to provide a system and method for spanning multiple work breakdown structures, or engagement models, thereby allowing a practitioner to understand a specific description of a single work product, yet apply that work product to many issues.

It is a further object of the invention to provide a system and method for defining market initiatives and offerings using models and template components which are responsive and flexible to an ever-changing marketplace.

It is a further object of the invention to provide a system and method for developing practitioner skills within specific problem areas together with understanding of relationships to other problem areas.

It is a further object of the invention to provide a system and method for deploying practitioners who have developed proficiencies in the application of specific work product descriptions to multiple models and templates.

It is a further object of the invention to provide a system and method for linking professional development plans for individual practitioners to market demands.

It is a further object of the invention to provide a system and method for allocating constrained resources among market opportunities.

It is a further object of the invention to provide a system and method for monitoring development consistency across engagements.

It is a further object of the invention to provide a system and method for quickly applying previously developed work products to new market opportunities.

Other benefits: being able to monitor cross engagement—how consistently developers are applying the work product descriptions; when a new market area is discovered, the common set of work product descriptions can be rapidly applied to the new marketplace (the next engagement model can be written very quickly, based on work product descriptions previously written).

SUMMARY OF THE INVENTION

A systems integration system and method provide in a first phase, an engagement model definition which will be used to address a marketplace requirement; in a second phase, the engagement model is utilized to create an engagement template which specifically addresses client requirements within the marketplace; and in a third phase, client engagements measured, monitored and controlled based upon the engagement model.

In accordance with an aspect of the invention, there is provided a computer program product configured to be operable responsive to a customer having requirements for defining an engagement model which will be used to address a marketplace requirement, utilizing that engagement model to create an engagement template which specifically addresses client requirements within that marketplace, and measuring, monitoring and controlling client engagements based upon the engagement model.

Other features and advantages of this invention will become apparent from the following detailed description of the presently preferred embodiment of the invention, taken in conjunction with the accompanying drawings.

BRIEF DESCRIPTION OF THE DRAWINGS

FIG. 7 illustrates the use case model constructs of FIG. 6.

FIG. 8 illustrates the nonfunctional requirements of FIG. 6.

FIG. 9 illustrates the architectural template types of FIG. 6.

FIG. 10 illustrates the class diagram structuring concepts of FIG. 6.

FIG. 11 illustrates views.

FIG. 12 illustrates relationship matrices.

BEST MODE FOR CARRYING OUT THE INVENTION

In accordance with the preferred embodiment of the invention, a system and method is provided by which to identify and document work product descriptions in a manner enabling consistency of solution design and delivery across different engagements with comparable and reusable results. By providing the same work product descriptions for use by different teams, the resulting data models are comparable and reusable.

Traditional system integration methodologies, when followed to address a problem space, tend to result in different sets of processes.

Even thought the system integration (SI) method of the invention embraces different processes for many problem areas, the fact that the method is built on the same work product descriptions results in consistency across methodological definitions. A good example would be that a process to create a business intelligence data warehouse is essentially different from the processes to create a web selling application. However, both of those problem areas require architectural diagrams which are defined essentially the same.

Figure 1:
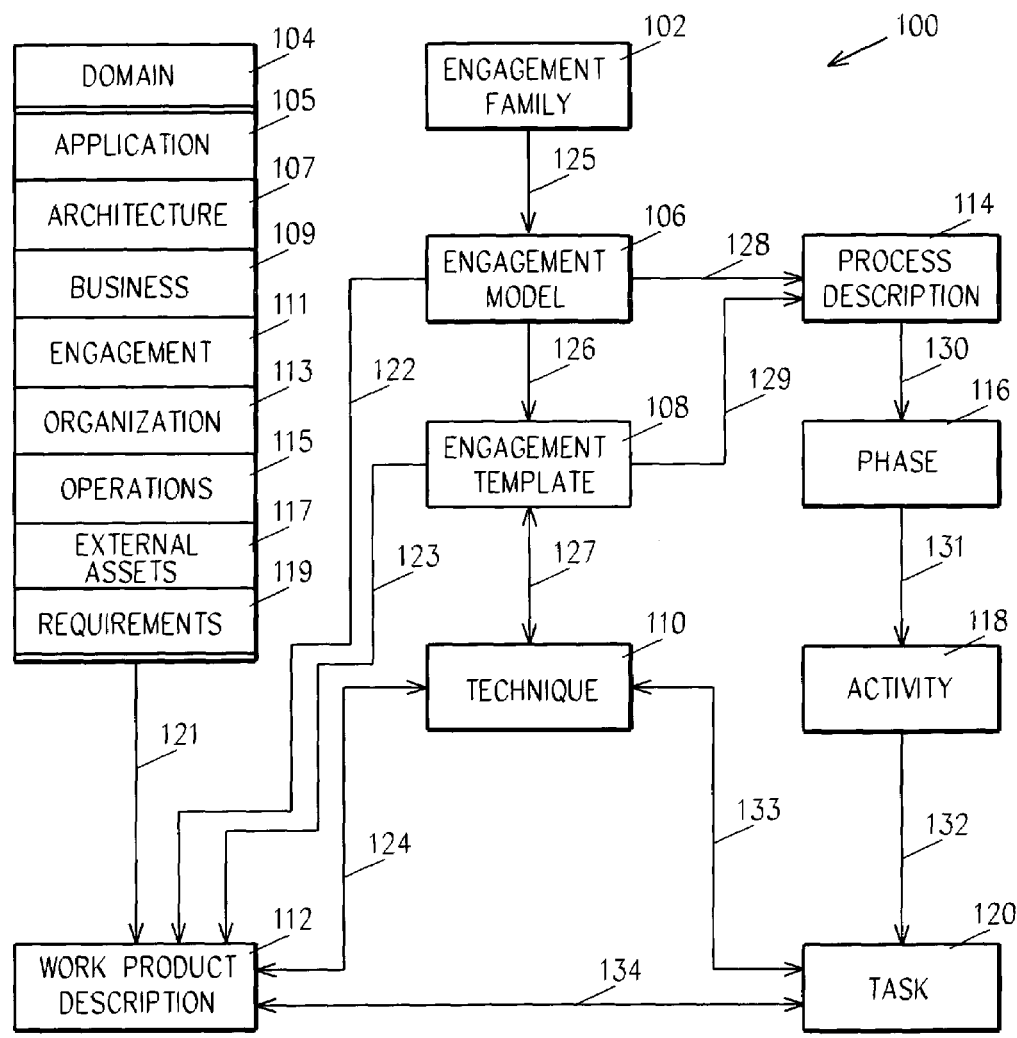
FIG. 1 is a meta-model diagram of the system components of a preferred embodiment of the invention.

Referring to the meta-model of FIG. 1, in accordance with a preferred embodiment of the invention, specific methodological components 100 are defined, including engagement family 102, domain 104, engagement model 106, engagement template 108, techniques 110, work product description 112, process description 114, phase 116, activity 118, and task 120. Each element of FIG. 1 (and also of FIG. 6) may be implemented as a database, such as a relational or hierarchical database, or as a knowledge-based system, or the like, which may be accessed and manipulated by way of browser or some other user terminal application via the Internet, intranet or some other network. Access to various elements, including databases, records, pages, documents, fields, and so forth and parts thereof may be controlled by way of access control lists (ACL's), such as is implemented in Lotus Notes (TM) and Domino (TM), or the like. Also, these database elements may be distributed as database instances among several sites in support of distributed development and market engagement teams, and synchronized using, for example, Notes replication techniques to maintain consistency among the various instances. Similarly, the elements of FIGS. 1 and 6 may be managed using a collaboration space, such as the Lotus QuickPlace (TM).

In broad overview, engagement family 102 is a description of a family of typical projects. Engagement model 106 describes a system and method for implementing a typical project. Engagement template 108 describes the system and method for an actual project. Domain 104 and work product descriptions 112 describe what to develop for a project. Process description 114, including phase 116, activity 118, and task 120 describe how to develop a project. Technique 110 provides further guidance to the development of work product descriptions 112 and tasks 120.

As is represented by line 125, an Engagement Family 102 describes a specific methodology including one or more Engagement Models 106.

As is represented by line 121, a Domain 104 is a logical grouping of Work Product Descriptions 112. A Domain is independent of process execution and process-oriented components. In accordance with a preferred embodiment of the invention, there are six Domains 104, including Application 105, Architecture 107, Business 109, Engagement 111, Organization 113, Operations 115. Domains 104 collect multiple work product descriptions 112 and show their interrelationship both within a single domain 104 as well as across a plurality of domains. Domains 104 are common across all engagement families 102 as well as spanning the full life-cycle of all engagement models 106 and templates 108.

Application domain 105 organizes work product descriptions 112 concerned with the design, development and testing of computer software components, applications and systems. The Application domain may be divided into sub-domains that generally address the life cycle of application development and the key functional roles of the application development community, including analysis & design, construction, testing, maintenance, and usability sub-domains.

Figure 2:
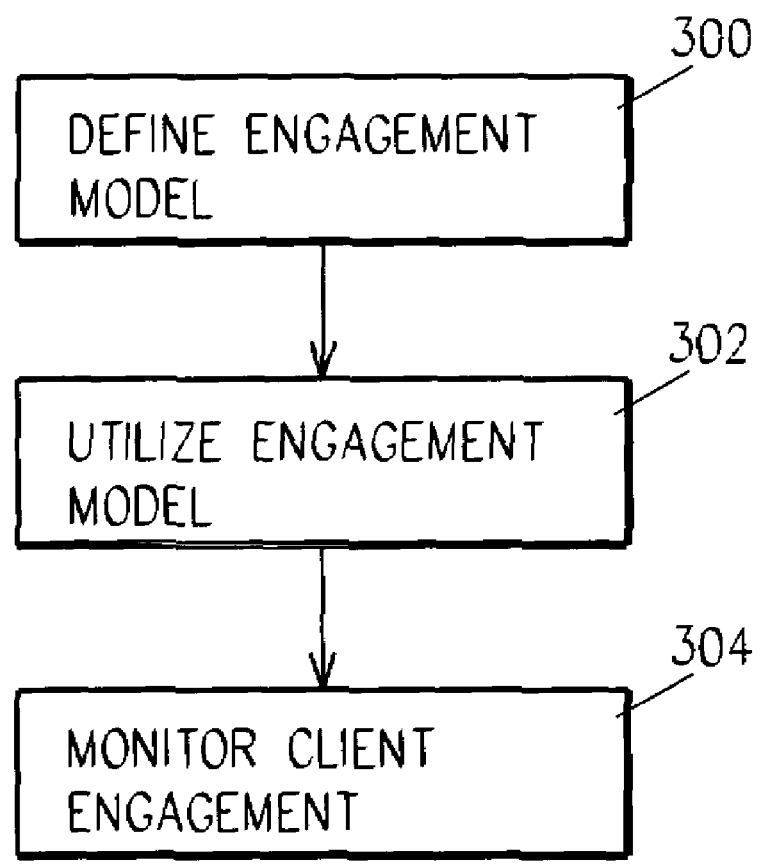
FIG. 2 is a high-level flow diagram illustrating the operation of the system of FIG. 1 in accordance with the three phases of the preferred embodiment of the invention.

Architecture domain 107, which will be further described hereafter in connection with FIG. 2, organizes work product descriptions 112 concerned with the architecture of an information technology (IT) system where business and infrastructure requirements are addressed. Architecture consists of a structure of software and hardware components. The work products 112 of architecture domain 107 deal with the externally visible properties of these components and how the components are related in a functional and operational context. Architecture domain 107 may be divided into sub-domains that generally address the life cycle of architecture development and the key functional roles of the architecture community, including general, enterprise, functional, operational, networking, and performance engineering sub-domains.

Business domain 109 organizes work product descriptions 112 concerned with the structured investigation of current and desired situations within the client's business. It contains work product descriptions 112 needed to: identify, assess and design business processes; define the business environment and formulate strategy for the current and future aspects of a client's business; identify, evaluate and select a capability or solution based on a set of business requirements; analyze requirements and create information models that meet business objectives; and perform financial analysis. Business domain 109 may be divided into sub-domains for process, strategy, selection, content, and financial.

Engagement domain 111 organizes work product descriptions 112 concerned with project management and technical delivery for projects worldwide. These work products address general project management duties and the specific duties required for delivery of technical services and products. These work products cover recurring and non-recurring activities for both planned and event-driven situations. Engagement domain 111 may be divided into sub-domains project management and technical delivery.

Organization domain 113 organizes work product descriptions 112 concerned with technology-based business transformations using systematically defined organization analysis and design and change management practices. It contains work product descriptions 112 needed to: assess and design organizations and jobs; integrate process, organization and technology plans; manage a client's transition to a new future state; and support the planning and delivery of end user education and training (in support of new systems and solutions) as well as the specification and production of materials to support use of those new systems. The Organization domain 115 may be divided into sub-domains for organization design; change management; and education, training and support.

Operations domain 115 organizes work product descriptions 112 concerned with the execution of a broad range of IT services, the management of IT resources and the protection of IT assets (both physical and logical). Operations domain 115 may be divided into sub-domains including general; information technology management; and security and privacy.

As is represented by lines 122 and 128, an engagement model 106 unifies the work product description 112 and process description 114, the two primary components of the system and method of the preferred embodiment of the invention, into the key operational component. Engagement model 106, the key operational component, is implemented as a work breakdown structure made of a collection of phases 116, activities 118, tasks 120, work product descriptions 112, techniques 110, and roles to support a specified engagement. Engagement model 106 is made up of the process description 114, which, as is represented by lines 130, 131 and 132, is implemented as a work breakdown structure made of a collection of phases 116, activities 118, tasks 120; as represented by line 122, work product descriptions 112; and as represented by lines 126 and 127, techniques 110 and roles to support a specified engagement.

Each engagement model 106 acts as a template project plan for a particular type of project and is a pre customized method to support a specific service offering or a specific type of engagement. An engagement model 106 defines what gets produced over the project lifetime, the process structure, the roles required to perform the engagement, and the techniques to be used.

As is represented by line 125, there can be one or more engagement models 106 within an engagement family 102 and, as is represented by line 126, an engagement model 106 can have one or more engagement templates 108.

An engagement template 108 is a specific instance of an engagement model. This means that it is the result of tailoring an engagement model 106 for use.

There are two types of templates 108. The first is the result from the actual use of an engagement model 106 on a project. This action produces an artifact known as an engagement template 108 consisting of an actual project plan with deliverables. The second is the result from the planned use of an engagement model 106 on future projects. This action produces an artifact known as an engagement template 108 consisting of a predefined project plan with examples for future use. As is represented by line 126, an engagement model 106 can have one or more engagement templates 108.

A technique 110 describes a specific approach used to perform a task or produce a work product. Techniques 110 provide guidance such as best practices and alternatives. Techniques 110 convey context-specific guidance while, as is represented by line 124, reusing work product descriptions 112. A technique 110 could be specific to an industry.

One of the two primary components of the method, a work product description 112 describes a particular type of work product that is produced on engagements. In an exemplary embodiment of the invention, approximately 250 work product descriptions comprise domains 104. These descriptions 112 cover what the work product is, what notation is used, why it is produced, how it is produced and how it is checked. The description may include at least one example, preferably derived from real project work. Examples of work product descriptions 112 implemented with architecture domain 107 will be described hereafter in connection with FIGS. 6–14.

Work product descriptions 112 are the most important components of a system or method or any other attempt to standardize on processes or ways of working. They provide the basis for method adoption, method integration, and the harvesting and structuring of intellectual capital. In accordance with the system and method of the invention, previously developed work products may be quickly applied to new market engagement models.

As is represented by line 134, the inputs and outputs to all tasks 120 in the method are described primarily in terms of work products which are instances of work product descriptions 112.

One of the two primary components of the system and method of the preferred embodiment of the invention, the process description 114 is used to decompose the development and delivery process into a hierarchy of steps. This hierarchy is known as a work breakdown structure. Engagement models 106 are implemented using work breakdown structures 116–120 for their process components. The work breakdown structure is composed of the following levels: phase 116, activity 118 and task 120. Phase 116 is the highest level in the hierarchy and task 120 is the lowest level. The work breakdown structure provides a default project plan.

Phase 116 is the highest level in the work breakdown structure of an engagement model 106. Phases 116 are broken down into activities 118 and conversely, activities are organized into phases. A phase 116 is a set of activities that constitute a contract of work with a customer or lead to a major milestone. A phase 116 is intended to produce one or more (client) deliverables.

Activity 118 is the intermediate level in the work breakdown structure of an engagement model 106. Activities 118 are broken down into tasks 120 and conversely, tasks are organized into activities. An activity 118 is a grouping of related tasks that produce output that is recognized as of value by a client. Usually an activity 118 ends with a significant review. Activities 118 are used to sequence the work effort and to manage complexity within a phase 116. Activity 118 is often associated with a possible sub-team structure.

Task 120 is the lowest level in the work breakdown structure of an engagement model 106. Tasks 120 are organized into activities 118. A task is a discrete unit of work that can be estimated and scheduled for producing one or more work products 112. A task 120 is assigned to one or more human resources for scheduling in a project plan. Tasks 120 are used to provide guidance for day-to-day management and execution of the project.

Typical methods incorporate some level of process description 114, including phase 116, activity 118 and task 120 in a waterfall, or step by step approach to allow understanding of how to implement a work, or issue resolution, method.

Process description 114, including phase 116, activity 118, and task 120 specify the manner in which to develop a system, answering the question "how-to."

In accordance with the invention, there are provided work product descriptions (WPDs) 112 which are common to all engagement families 102. Flexibly defined engagement templates 108 based upon methodologically defined engagement models 106 (that is, engagement models defined in accordance with the system and method of the preferred embodiment of the invention) separate the methodology of the invention from actual use in client engagements. This separation of what is accomplished from how it is accomplished allows a practitioner implementing the system and method of the invention to understand what should be applied in any situation to address the issues and supporting hypothesis of a client solution. In addition, work product descriptions 112 enable the developer to focus on discrete problem areas via domains 104.

As previously noted, prior art methodologies are focused on the 'how to' steps, such as process descriptions 114–120. The present invention focuses on 'what' to develop; that is, domains 104 and work product descriptions 112. Therefore, by first defining 'what to' develop (that is, domains 104 and work product descriptions 112), then the steps 114–120 to be taken to develop a specific work product description 112 become the 'how to'. This is accomplished by separating work product descriptions 112 from process descriptions 114–120, and relating them through engagement model 106 and engagement template 108.

Line 123 represents the fact that a work product description 112 is developed by a task 120, tasks 120 are collected into activities 118, activities are collected into phases 116, that task 120, activity 118, and phase 116 are all process descriptions 114, that process descriptions 114 are utilized in engagement template 108. Line 123 is a direct link that says this set of work product descriptions 112 is in engagement template 108. The true relationship is that a task 120 is executed to create an instance of a work product description 112.

Line 129 represents that an engagement template 108 utilizes a set of process descriptions 114–120.

Line 133 represents that a technique 110 may provide detail (such as best practices) on how to implement a task 120.

Referring to FIG. 2, by way of description of the operation of the preferred embodiment of the system and method of FIG. 1, three phases are defined. During first phase 300, an engagement model is defined; during second phase 302, that engagement model is utilized; and during third phase 304, specific client engagements are monitored and managed.

First phase 300 involves enabling the marketplace. This involves understanding how to address its requirements, then enabling a generic engagement model 106 including definitions of best practices and reusable assets, and finally generating necessary work product descriptions 112.

Second phase 302 involves creating the attack, resource, and deployment plans for a specific client using an engagement template 108 pulled down and personalized to this client from the engagement model 106 defined during first phase 300.

Third phase 304 involves utilizing and cyclically (or iteratively) redefining the engagement template 108 while applying work product descriptions 112 and process descriptions 114–120. This phase enables monitoring the marketplace and allocating constrained resources thereto, as will be more fully explained hereafter.

These first through third phases 300–304 will next be described in further detail.

Figure 3:
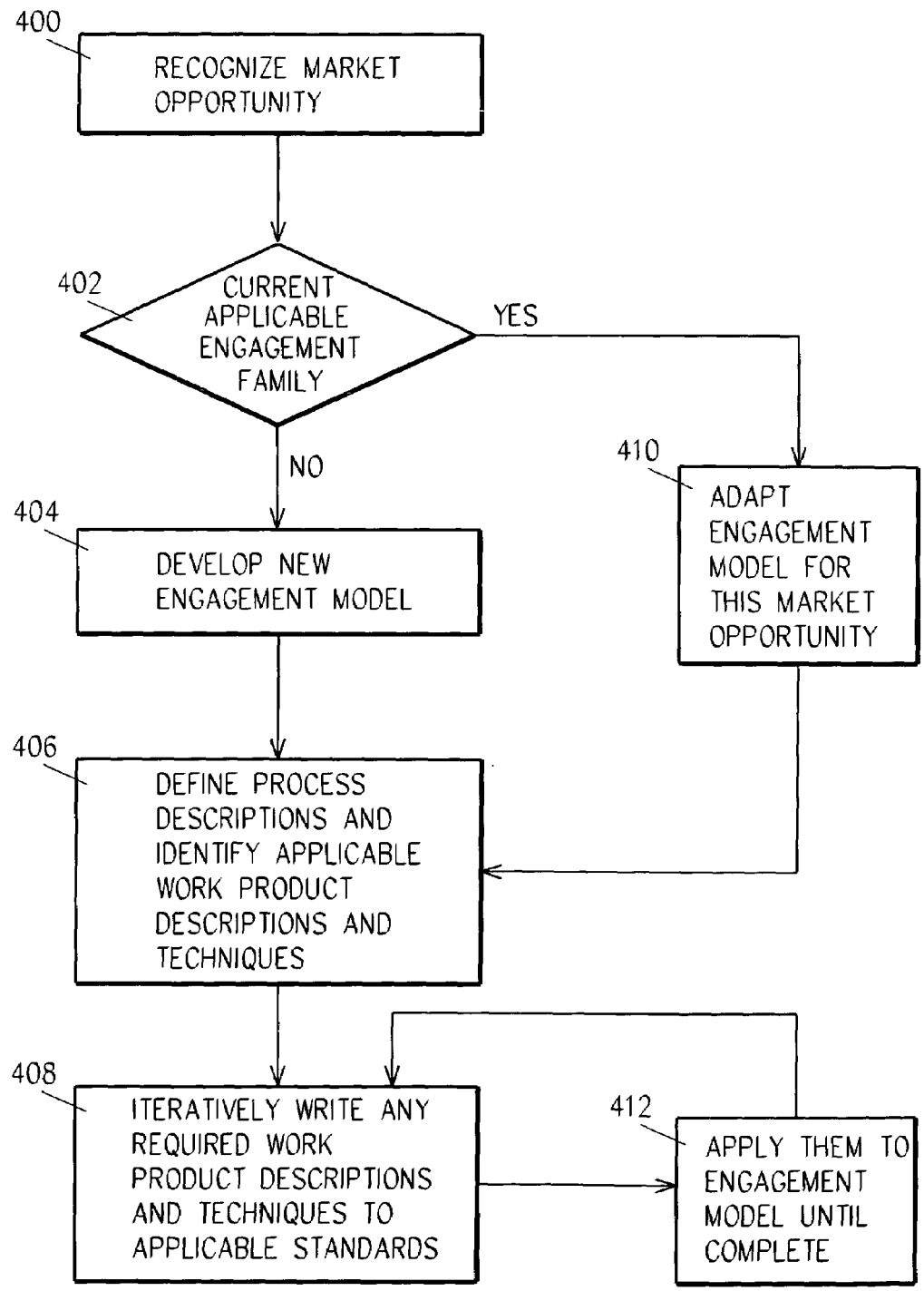
FIG. 3 is a flow diagram illustrating the steps of the first phase of method of FIG. 2.

Referring to FIG. 3, first phase 300 begins with step 400, during which a market opportunity is recognized. That is, someone within an organization recognizes a new set of issues in the marketplace, and desires to provide engagements and solutions to meet those issues. This step involves research, including monitoring what is being sold in the market.

In step 402, current engagement families 102 are interrogated to determine their applicability to that market opportunity.

In step 404, if no applicable engagement families 102 are identified, a new engagement model 106 is developed. In step 410, if an applicable engagement model 106 is identified, it is adapted as required for this market opportunity.

In step 406, in concert with defining process descriptions 114–120, the work product descriptions 112 and techniques 110 which are or may be made applicable to the new engagement model 106 are identified.

In steps 408 and 412, if new or modified work product descriptions 112 or techniques 110 are required, then such are written to applicable standards and applied to the engagement model 106 until the engagement model 106 is complete.

Figure 4:
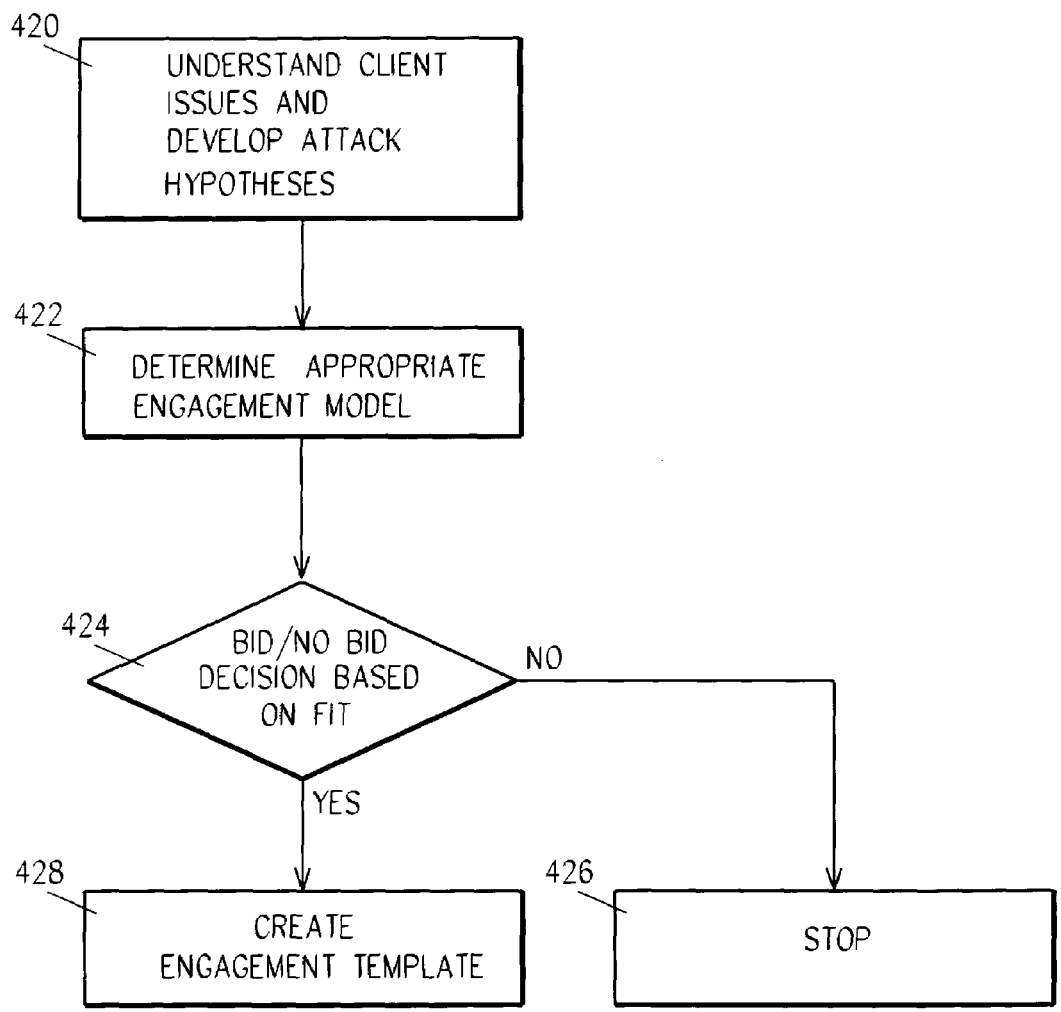
FIG. 4 is a flow diagram illustrating the steps of the second phase of the method of FIG. 2.

Referring to FIG. 4, second phase 302 begins with step 420, in which an understanding of client issues is developed and an attack hypothesis defined.

In step 422, engagement family 102 and engagement models 106 resulting from first phase 300 are accessed to select a most appropriate engagement model 106.

In step 424, optimally, a bid/no bid decision based upon the fit of the selected engagement model to this market opportunity. The purpose is step is to enable a strategic basis for management of constrained resources, and is used to determine which market places or opportunities to address. If engagement models with a good fit don't exist, then it may be known that, at least in the past, the current market opportunities have not been addressed, and management is enabled to control from market penetration based upon a market view, rather than client by client. The decision must then be made to not bid, or else to apply a set of resources to the development of engagement families and engagement models applicable to this market opportunity.

In step 426, if the decision is no bid, the process stops.

In step 428, if the decision is to bid 428, an engagement template 108 is created. This involves applying a market oriented engagement model 106 to the requirements of a specific customer, and involves adding and subtracting work product descriptions 112, process descriptions 114–120, and techniques 110 as may be appropriate.

Figure 5:
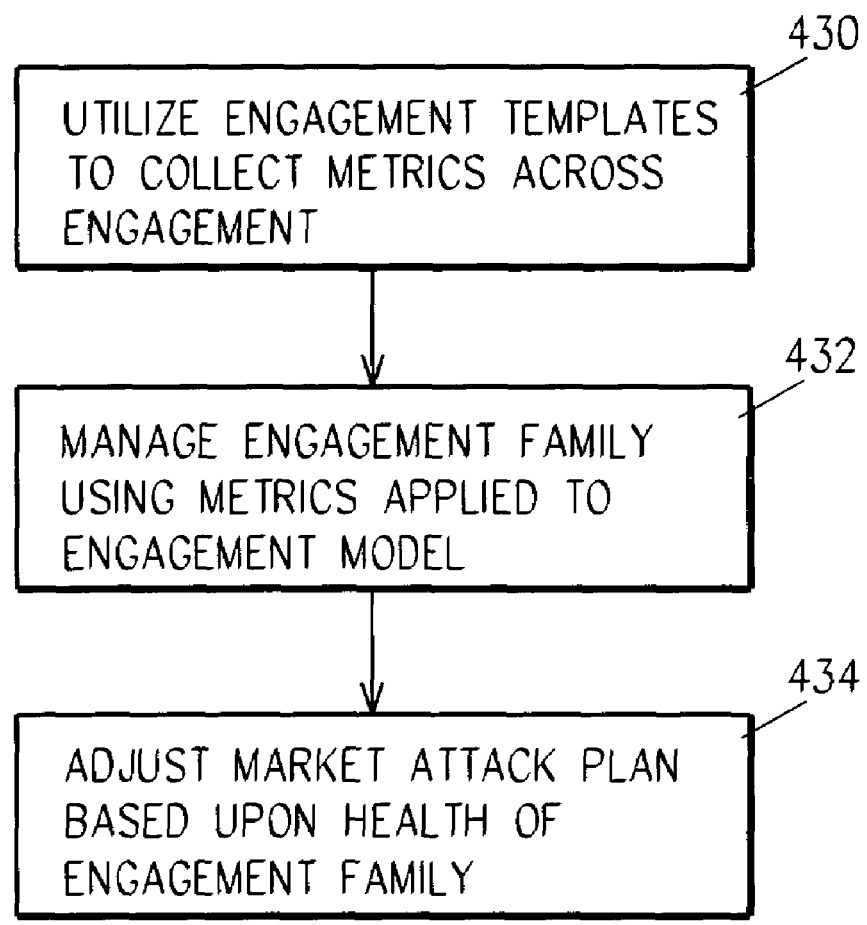
FIG. 5 is a flow diagram illustrating the steps of the third phase of the method of FIG. 2.

Referring to FIG. 5, third phase 304 involves applying measurements and metrics for such parameters as risk, costs, customer satisfaction derived from actual engagements resulting from engagement templates 108 to the engagement family 102 level.

In step 430, metrics and measurements are collected across engagements utilizing engagement templates 108.

In step 432, these metrics and measurements are rolled up to the originating engagement model, thereby enabling the management of the parent, related engagement family based upon the measures and metrics.

In step 434, based upon the health of the engagement family under examination as indicated by the measures and metrics collected in step 430, the market attack plan is modified and adjusted as appropriate. This involves funding decisions—if an engagement family is not performing, a decision is made to cease working the related market opportunities, or to enhance the ability to work those opportunities such as by further funding to develop needed skills or tools.

Figure 6:
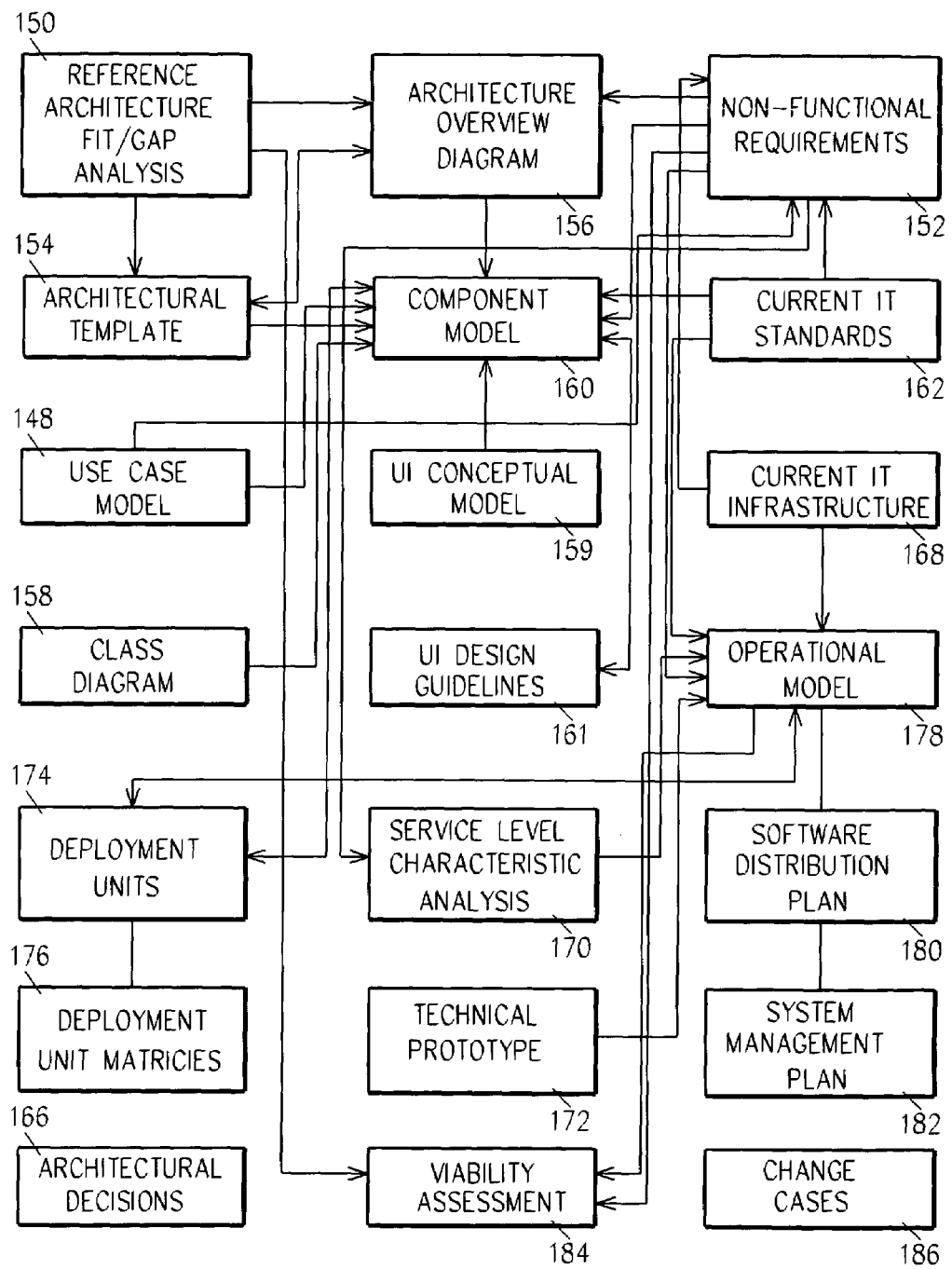
FIG. 6 is a diagram illustrating the interrelationships of work product descriptions 112 for an architecture domain 107, which is an example of domain 104 in FIG. 1.

Referring to FIG. 6, the work product descriptions 112 in architecture domain 107 (one of several domains 104) are illustrated with relationships to selected work product descriptions 112 from application domain 105 (another of domains 104).

Use case model work product 148 is a member of the application domain 105 but is included in the architecture domain 107 dependency diagram of FIG. 6 to visually communicate the relationship amongst the domains 104. Use case model work product 148 describes the functional requirements of the system under development. The model uses graphical symbols and text to specify how users in specific roles will use the system (i.e., use cases). The textual descriptions describing the use cases are from a user's point of view and do not describe how the system works internally or its internal structure or mechanisms.

Referring to FIG. 7, use case model 148 is described by the following constructs: actors 201, including name, description, status, subclass, superclass, and associations; use cases 202, including number, subject area, business event, name, overview, preconditions, description, associations, inputs, outputs, traceable to, usability index, and notes; communication 203, including associations between actors and uses cases; relationships 204 between use cases (same as use case associations); termination outcomes 205; conditions 206 affecting termination outcomes 205; termination outcomes decision table 207; use case scenarios 208, including number, termination outcome, description, and notes; problem domain concept definitions 209; system steps decision table 210; flow of events table 211; and system sequence diagram 212.

Actor 201 names and descriptions, use case 202 numbers, use case 202 names, use case 202 business events, and use case 202 overviews as well as communication-associations 203 between the actors and the use cases provide an overview of the functional requirements. The other constructs 204–212 of the model 148 document the expected usage, user interactions, and behaviors of the system in different styles and depth.

The reference architecture fit/gap analysis 150 work product is a short document stating the reference architecture to be used as the basis for the current project's architecture and including the rationale for this decision.

A reference architecture (not shown) is a predefined architectural pattern designed for use in particular business and technical contexts.

One source of reference architectures within IBM is Enterprise Solution Structures (ESS), an IBM framework and asset base of reference architectures and other architectural assets. The description and examples given here refer specifically to ESS, but the work product is generic and applies equally to selection of reference architectures from other sources.

Reference architecture fit/gap analysis 150 tabulates the key factors involved in selecting a reference architecture, including business scenarios, business drivers and architecture characteristics.

Asset selection involves tradeoffs. Reference architecture fit/gap analysis 150 documents the differences between the desired project architecture and the reference architecture in a statement-of-fit and identifies modifications required for the project.

Referring to FIG. 8, nonfunctional requirements work product 152 specifies the nonfunctional requirements that the information technology (IT) system must satisfy. Nonfunctional requirements 152 include service level requirements (SLRs) 215, which are runtime properties the system as a whole, or parts of the system, must satisfy. SLRs 215 include the following:

Capacity and performance (volumetrics),

Availability

Security

System management

Portability

Maintainability

For convenience, nonfunctional requirements work product 152 also includes constraints 216 the system must conform to or satisfy. System constraints 216 include the following:

The business constraints which the system must satisfy (e.g., geographical location).

The technical standards the system must satisfy.

The technical 'givens' which constrain the system (e.g., existing hardware, which database management systems (DBMS) must be used).

All these requirements 152 are presented in a way that facilitates the design and development of the operational model 178, that is, the computers, networks, and other platforms on which the application will execute and by which it is managed. They also feed into the design of technical and application components. For example, service level requirements may imply component performance requirements. Sometimes it is more convenient to specify the details of nonfunctional requirements 152 in other work products and just refer to them in this work product. For example, use case frequencies could be detailed in the use case model 149 and data volumes in class descriptions 158.

Architectural template work product 154 documents the essential collaborations and behaviors that underlie solutions to the typical problems (i.e., persistence, transactions, event notification, etc.) inherent in most projects of any size and complexity. For each of these areas, a solution must be constructed or reused. These collaborations are representative of those occurring in the system and can be used to structure all or part of the system.

An architectural template 154 includes abstract use cases, interaction diagrams, and class diagrams and may represent collaborations between components or collaborations between objects. Often an overview of the system, in the form of a layered representation, can be derived from the classes that participate in these typical collaborations. Such layered representations take the structure of an informal picture accompanied by free format text.

Referring to FIG. 9, two important types of architectural template 154 are transaction strategies 218 and persistence strategies 219.

Transaction strategy 218 is a description of how a project intends to ensure that the system will maintain a consistent state throughout the modifications applied to it. This can be achieved if transactions have the ACID properties (atomicity, consistency, isolation, and durability) and frequently involve locking. Transactions are important to provide robustness and consistency in distributed systems and enable users at different locations to work together in a coordinated fashion. In the event of a failure, any ongoing transactions are aborted, and uncommitted modified objects are restored to a consistent state. In a distributed object environment, transaction management may not be left to the database or to a conventional TP monitor, allowing for much finer-grained resource control mechanisms than otherwise can be obtained.

Persistence strategy 219 describes how a project is to manage persistent objects. An object is said to be persistent when its lifetime extends beyond the lifetime of the program that creates it. Persistence is of particular concern to those building object-oriented systems for two reasons: first, objects in some languages are not memory-resident and must be preserved. Second, while object attributes (data) are conceptually encapsulated, in fact they are often kept in a relational database. Therefore, a strategy must be devised to manage these long-lived data.

The architecture overview diagram work product 156 is a schematic diagram that represents the governing ideas and candidate building blocks of an IT system. It provides an overview of the main conceptual elements and relationships in an IT architecture, which frequently include candidate subsystems, components, nodes, connections, data stores, users and external systems. As communication is its main purpose, it is more important for the architecture overview diagram 156 to be simple, brief, clear, and understandable than it is to be comprehensive or accurate in all details. Consequently the diagram uses an informal rich picture notation. It typically includes supporting text that explains the main concepts of the architecture.

Where alternative architectural solutions are being explored, an architecture overview diagram 156 may be produced for each option to enable various stakeholders to discuss the tradeoffs between the options.

The architecture overview diagram 156 is produced very early in a project (possibly pre proposal) and influences the initial component model 160 and operational model 178. It is not intended that design commitments be based on this overview until the (more formal) component model 160 and operational model 178 have been developed and validated. Subsequently, the component model 160 and operational model 178 are the primary models, and the architecture overview diagram 156 is a derivable view, which is revised if there are changes to the main concepts and relationships (though it is not intended to reflect detailed design decisions).

Related work products 112 describe the system context and the architectural decisions and principles 166.

Referring to FIG. 10, the class diagram work product 158 is a member of the application domain 105 (one of domains 104) but is included in the architecture domain 107 (another of domains 104) dependency diagram of FIG. 6 to visually communicate the relationship amongst the domains 104. The class diagram work product 158 is a structural representation of the software objects and their static relationships that comprise the system being developed. This description is made using the following structuring concepts: classes 221, including instances of classes; attributes 222, representing the knowledge responsibilities or data; methods 223 representing operational responsibilities or functions; association relationships 224 between classes; aggregation relationships 225 between aggregate and component classes; inheritance relationships 226 between super classes and subclasses; and formal or informal constraint descriptions 227 (optional).

Class diagram work product 158 also includes detailed descriptions of each of these components 221–227. Depending on the tool being used descriptions for each of these components 221–227 will often be embedded in the model, otherwise detailed descriptions are documented elsewhere. The descriptions record volumetric information—the number of instances of each class 221, the average size of an instance 221 in terms of secondary storage required, and association volumetrics 224.

Referring to FIG. 11, class diagram work product 158 is typically developed iteratively over the life cycle of the project. Though there may be many iterations of this work product 158 depending on the overall complexity of the solution, it is often convenient to think in general terms of what are the typical elaboration points during development.

The initial or conceptual view 231 focuses on what is traditionally thought of as analysis, i.e., "what" is needed for the solution. Analysis is concerned with defining the problem domain by understanding what aspects of a business model are to be included in the software system. At this point the design should remain technology neutral, although not technology ignorant, as the decisions about how the software system will be constructed are not the primary concern at this time.

Next, the logical design or specification view 232 starts to answer the questions on "how" the system will be implemented and where the overall structure of the solution is defined. Factors such as concurrency and distribution, coordination and sharing, transactions and persistence, user interface capability, and system interfaces such as communication are also taken into account as well. At this stage in the design process, much of the design is dependent on the technology and architectural decisions 166 also being made at this time. Likewise certain design decisions may influence technology and architecture as well.

The final iteration is the physical design or implementation view 233 that details the constructs and mechanisms to be used based on the actual implementation language chosen. This may include the refactoring of existing classes 221 and the introduction of new classes 221 to handle implementation specific details.

The user interface (UI) conceptual model work product 159 is a member of the application domain 105 but is included in the architecture domain 107 dependency diagram of FIG. 6 to visually communicate the relationship amongst the domains 104. The user interface conceptual model work product 159 forms the foundation upon which the entire interface is built. It provides a visual and logical framework for the overall user interface design. This includes the high-level look (visual paradigms, aesthetics) and feel (interaction paradigm) and the metaphors (e.g., icons, images) used to represent real-world objects and their relationships. It can be presented in a number of different ways, including prototypes, diagrams, drawings or pictures. UI conceptual model 159 contains visual images and text describing how users interact with them to perform tasks and an explanation of how the objects and metaphors were selected and in what way they relate to mental models or real world objects.

The component model work product 160 describes the entire hierarchy of components and documents according to their responsibilities and required service levels, their (static) relationships, and the way they collaborate to deliver required functionality.

A component is a relatively independent part of an IT system which is characterized by its responsibilities and eventually by the interface(s) it offers. Components can be decomposed into smaller components or composed into larger components.

Most components are software, though some may be hardware. Some components already exist, but it may be necessary to build or buy others. A component can be a collection of classes 221 (e.g., all the classes dealing with reinsurance), a program (e.g., one that performs event notification), a part of a product (e.g., CICS/2 or DB2), or a hardware device (e.g., a scanner). Some are primarily concerned with data storage. They can be very large or quite small.

A component model 160 often evolves through several stages taking into account successive system distribution, the use of specific products, the choice of middleware, and other technologies.

The user interface (UI) design guidelines work product 161 is a member of the application domain 105 but is included in the architecture domain dependency diagram of FIG. 6 to visually communicate the relationship amongst the domains 104. The user interface design guidelines work product 161 description provides a consistent set of standards to assist developers in constructing work products related to user interfaces (UIs). It typically contains a reference to (not a copy of) certain widely accepted industry standards (such as the Microsoft Windows User-Interface Guidelines or the IBM Common User Access guidelines). The industry standard reference may also be supplemented with a set of external regulations and standards, such as ISO (International Standards Organization) standards concerning display and keyboard standards for character width and height, display brightness and contrast, and keyboard key placement. In addition, the user interface design guidelines work product 161 explicitly documents mandatory, recommended, discouraged, and bad practices based on the most frequent types of errors that are made against this standard and the specific types of systems that are being built across the organization.

Within the same company, different classes of applications may require a further refinement of the user interface design guidelines 161. For instance: retail kiosk applications in a bank will be used by actual customers and will therefore have higher usability requirements than traditional transaction-oriented applications used by the retail bank's employees. The latter can be trained; the former cannot. Simply because the retail kiosk is a different style of interface, there may be some different guidelines. Thus, user interface design guidelines 161 may be applied across projects or across an application suite as a means to ensure enterprise wide user interface design consistency.

A current IT standards work product document 162 lists and details predetermined standards of the information technology environment. These standards may have been determined by a previous study, or may be de-facto standards based on the installed technology in the company. The rationale or source of such determinations is documented for reference purposes.

The architectural decisions work product 166 describes architectural decisions, architectural principles and policies, and architecture evaluation criteria. An architecture 166 guides planning, design, implementation, and testing. An architecture is understood partly through its principles and through the record of the important decisions made during its development. A well-documented architecture 166 includes its own justification and evaluation criteria. Architectural decisions 166 document the important decisions about all aspects of architecture including the structure of the system, the provision and allocation of function, the contextual fitness of the system, and adherence to standards. Architecture principles and policies are underlying general rules that hold true across the architecture. They define the essence of the architecture by capturing the thinking behind it. Architectural principles are mainly described by reference either to papers or books, to the architecture of another system, or to an architectural framework. These principles and policies are often introduced as they are needed, when the reasoning behind an architectural decision needs to be made explicit and justified. Architecture evaluation criteria describe the criteria by which the architecture will be judged. They are traceable backward to business and system requirements and forward to design elements.

The current information technology (IT) infrastructure work product 168 is an inventory of the installed base of hardware, operating systems, network hardware and software, and other technical capabilities in the enterprise. It is both a text-based inventory and a graphical depiction of the environment.

The service level characteristic analysis work product 170 is a report analyzing a particular service level of interest for one or more architecture options. This work product should cover all service level characteristics, including: performance and capacity (e.g., response times, throughput and machine sizing); availability (e.g., mean time between failure, disaster recovery mechanisms, etc.); security (e.g., systematic benign attempts to break in). It may be based on data from a technical prototype, data from a simulation, an analytic model (e.g., in a spreadsheet or via a modeling tool such as SES/Workbench), visits to reference sites, and/or literature research. Service level characteristic analysis 170 typically includes a specification of the architecture configurations being analyzed, the analysis methodology, assumptions and exclusions, any sample data used, and quantitative results and recommendations.

The technical prototype work product 172 explores technical aspects of the design. The prototype might be developed to study, to explore performance, to learn how an interface works with a legacy system, or to learn how some new infrastructure works. The technical prototype 172 itself may be discarded, but some of the code technical prototype may be useful for the final system. It is not intended to be a prototype that gradually evolves into the final system.

The deployment unit work product 174 describes components that are grouped together for deployment purposes (i.e., they execute, get stored, or are installed together on a node). Deployment units 174 aggregate components with similar service level requirements. Consequently, a component could end up in multiple deployment units 174 for each of the above-mentioned deployment purposes. A deployment unit is considered as a single unit for placement considerations. A deployment unit 174 identifies the grouped components and adds or references other information (e.g., resource requirements, service level requirements, and technical dependencies) that is relevant for their subsequent placement.

Referring to FIG. 12, deployment unit matrices work product 176 describes components that are grouped together for deployment purposes. It depicts the relationships between deployment units 236, 237 and between users 235 and deployment units. In this context, it is useful to distinguish between data deployment units 236, which are mainly concerned with data, and execution deployment units 237, which are mainly concerned with processing. Matrices 238 describe three main relationships: user 235/data deployment unit 236; user 235/execution deployment unit 237; and execution deployment unit 236/data deployment unit 236. The same format can also be used to describe data/data relationships where one data deployment unit 236 is a copy of or is derived from another data deployment unit 236. In addition, the relationships between deployment units 236, 237 may have specific service level requirements. For example, access by a particular user group to a particular data group may have specific performance, availability, or security requirements.

Figure 13:
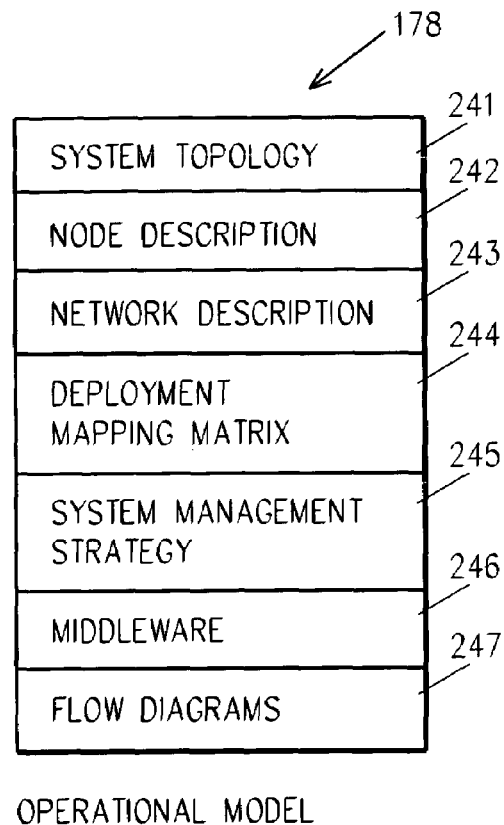
FIG. 13 illustrates an operation model of FIG. 6.

Referring to FIG. 13, the operational model work product 178 is a representation of a network of computer systems, their associated peripherals and the systems software, middleware, and application software that they run. An operational model 178 includes the following:

System topology 241: one or more diagrams that show the topology and geographic distribution of the system, the definition of the nodes (computer platforms) and network connections, and where and how users and external systems interact with the system being developed.

Node description 242: a detailed description of each node, which usually includes a table or box diagram that identifies and classifies the software components that run on the node. For convenience, components (which may not all be software) are often grouped into deployment units for ease of placement. The description includes the node's availability, performance, security and other nonfunctional characteristics.

Network description 243: a detailed description of the networks that connect the nodes, together with their protocol layers and services.

Deployment mapping matrix 244: a mapping matrix of deployment units to nodes, if a significant number of deployment units appear in more than one node (for example, if there is complex data segmentation and replication). Each deployment unit is a convenient grouping of components from the software architecture.

System management strategy 245: a description of the systems management strategy, including decisions about centralized vs. distributed managing stations, backup and recovery strategy, software distribution models and approach, change control, configuration management, and other systems management processes.

Middleware 246: a description of middleware services and products and the key middleware choices (includes security, object request brokers, etc.).

Flow diagrams 247: descriptions of walk-throughs, which describe the flow of a business activity from a user all the way through the system and back to the user. These textual descriptions may be augmented by interaction diagrams, which show the flow of messages between nodes.

Nodes and connections may be conceptual, specified, or actual physical computer systems, depending on the stage of analysis and design:

Conceptual corresponds to an early stage of design. Conceptual nodes ignore many technological limitations and focus on application software components, deferring treatment of middleware and other software.

Specified refers to a detailed specification of a computer platform or network. Technological limitations are fully taken into account but the detailed choice of technology is not made.

Physical refers to the specific types of computers, networks, and software that make up the system.

Generally an operation model 178 develops from conceptual to specified to physical. Depending on the complexity of the problem and the starting point, it may not be necessary to go through all three stages. For example, an architecture may be heavily constrained by physical platform decisions that have already been made or by existing specification-level reference architecture. At any one time, different parts of the description may be at different levels.

As the operational model 178 is developed, detail is added within and between levels of abstraction. The network topology 243 may also be restructured as the design passes from one level to the next.

The software distribution plan work product 180 is a description of the way software releases will be distributed to the computer platforms on which they must be installed, a cost justification of any investment needed to implement the approach, and a plan for the implementation.

A software distribution plan 180 is part of a systems management engagement 182 or part of an IT system architecture operational model 178. The software distribution plan 180 includes the data required to allow the operations department to perform the software configuration, installation, and distribution (CID) process. Generating a software distribution plan 180 is a way to avoid significant adverse impact on end users and IT infrastructure 168 due to changes and the overall cost of distributing the solution. The plan 180, when implemented, will provide end users, who are accepting a new application and possibly new hardware, with the ability to restore their systems to a known state on short notice. Downtime, due to user error or system disruption, cannot be tolerated in mission critical applications, such as a call center for a telephone company or other utility.

Full automation of the software distribution process 180 is not always necessary, but the plan will identify the cost benefit of automation. The information collected in the plan 180 will be valuable for any mixture of manual and automated processes.

Figure 14:
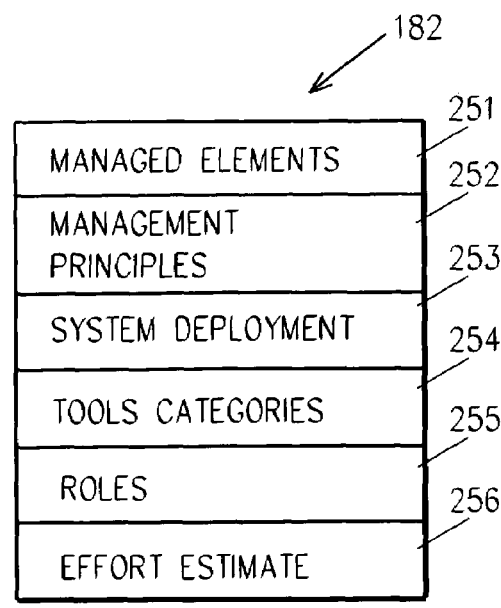
FIG. 14 illustrates a system management plan of FIG. 6.

Referring to FIG. 14, a systems management plan work product 182 represents an overall view of:

The elements 251 (nodes and components) that need to be managed,

The principles 252 by which the enterprise chooses to manage these elements,

The processes 253 selected to deploy and manage the IT System,

The identification of the tools categories 254 that need to be evaluated to support the selected systems management processes The roles 255 required to implement the processes according to the enterprise principles, A high-level estimate 256 of the effort required to implement the selected processes.

The Viability Assessment work product 184 is an assessment of the viability of implementing a proposed IT system. It is concerned with all aspects of solution viability, including the probability of developing subsystems that meet the functional requirements, successful deployment, and the probability of the implementation architecture meeting the nonfunctional requirements. This work product is based on the idea that a design can only be deemed "viable" within the context of the development skills, client acceptance of technical elements, implementation skills, time scales and money available. The effort invested in developing this work product should also contribute to improving the probability a project will succeed. The assessment team should develop recommendations that remove or contain the project's risks. Risk can be thought of as anything that exposes the project to future loss. Areas of potential loss can include budget, schedule, product quality, reputation of participants, or customer satisfaction.

This work product 184 continually evolves through the project, refining and clarifying the "probability of success" of deploying the IT system as more decisions are made and more information becomes available. Specifically, the viability assessment 184 is updated at the end of the macro and micro phases for each major version of the operational and component models 178, 160. In addition, viability assessment 184 is a technique that can be used as part of an external review of a project's technical solution by a Quality Assurance organization or other business management function.

Change cases work product 186 documents future changes to system capabilities and properties, the way the system is used, and system operating and support environments. This work product 186 clarifies properties of the system described by the phrases, "easy to extend," "easy to port," "easy to maintain," "robust in the face of change," and "quick to develop." Change cases 186 focus on what is important and likely rather than what is possible. Change cases 186 tries to predict changes. Such predictions rarely turn out to be exactly true. The properties of a system are determined by users, sponsors, suppliers, developers, and other stakeholders. Changes can arise from many sources, for example: business drivers, including new and modified business processes and goals; technology drivers, which refers to adaptation of the system to new platforms and integration with new components; changes in the profile of the average user; changes in the integration needs with other systems; and scope changes arising from the migration of functionality from external systems.

Referring again to FIG. 1, separating process 114 and work product 112 descriptions in accordance with the system and method of the preferred embodiment of the invention achieves several major benefits. Among these are (1) market initiatives and offerings which are readily defined using engagement models 106 and engagement templates 108 that provide responsive and flexible components to respond to the ever-changing marketplace; (2) practitioner skills in the understanding of specific problem areas, together with understanding of the relationship to other areas, are developed through domains 104; (3) because work product descriptions 112 and domains 104 span all engagement families 102, a practitioner who has developed proficiencies in the application of specific work product descriptions 112 may be deployed to multiple models 106 and templates 108; and (4) professional development plans for individual practitioners can be linked to market demands.

While the benefits and advantages of methodologically driven engagements is well known in the industry, the present invention provides heretofore unrealized flexibility to the application of the methodological approach in real-life client engagements. That is, the system and method of the preferred embodiment of the invention are tailored to solve a specific clients' issues by identifying the proper work product descriptions 112 and process descriptions 114 in the development of contractual deliverables and project plans.

ADVANTAGES OVER THE PRIOR ART

It is an advantage of the invention that there is provided a system and method for developing coordinated and repeatable approaches used to solve issues and related hypothesis in client engagements.

It is an advantage of the invention that there is provided a system and method for issue resolution based on work product, as distinguished from the traditional process aspect of other methodologies.

It is an advantage of the invention that there is provided a system and method for issue resolution focused on delivery, as distinguished from the process for delivery.

It is an advantage of the invention that there is provided a system and method for issue resolution which, by focusing on work product, allows specific roles and tasks to be identified during work product development, resulting in manageable plans and assignments.

It is an advantage of the invention that there is provided a system and method for spanning multiple work breakdown structures, or engagement models, thereby allowing a practitioner to understand a specific description of a single work product, yet apply that work product to many issues.

It is an advantage of the invention that there is provided a system and method for defining market initiatives and offerings using models and templates components which are responsive and flexible to an ever-changing marketplace.

It is an advantage of the invention that there is provided a system and method for developing practitioner skills within specific problem areas together with understanding of relationships to other problem areas.

It is an advantage of the invention that there is provided a system and method for deploying practitioners who have developed proficiencies in the application of specific work product descriptions to multiple models and templates.

It is an advantage of the invention that there is provided a system and method for linking professional development plans for individual practitioners to market demands.

ALTERNATIVE EMBODIMENTS

It will be appreciated that, although specific embodiments of the invention have been described herein for purposes of illustration, various modifications may be made without departing from the spirit and scope of the invention. In particular, it is within the scope of the invention to provide a computer program product or program element, or a program storage or memory device such as a solid or fluid transmission medium, magnetic or optical wire, tape or disc, or the like, for storing signals readable by a machine, for controlling the operation of a computer according to the method of the invention and/or to

What is claimed is:

1. A systems integration method enabling consistency to integrated application solution design and delivery across different engagements with comparable and reusable results, comprising the steps of:

providing a collection of databases on a network accessible via a terminal application a domain database, a work product description database, a method process description database, an engagement model database, an engagement family database, and engagement template database;

said domain database comprising a logical grouping of said work product descriptions, including application, architecture, business, engagement, organization, operations, external assets, and requirements;

said method process description database comprising a set of method process descriptions for describing how each of a plurality of hardware, software, and process components comprising application solutions are to be designed, developed, and implemented; and further phase, activity, and task databases for use in decomposing a development and delivery process into a hierarchy of steps of a default project plan; said phase including a set of activities for a contract with a customer; said activity including a grouping of related tasks for sequencing work effort and managing complexity within a phase; said task being a unit of work estimated and scheduled for producing a work product;

said engagement template database comprising a collection of templates, each template a result of tailoring a specific engagement models for use;

said work product description database comprising a set of work product descriptions for defining a set of said components for each tangible artifact produced and consumed in connection with a specific application solution, each said work product description specifying purpose, description, notation, example, development approach, validation and verification guidelines, advice and guidance, estimating considerations, and references, said descriptions of work products being produced on engagements as a basis for method adoption, method integration, and harvesting and structuring of intellectual capital for application to new market engagement models;

said engagement model database comprising a plurality of template project plans, each for a specific service offering and engagement; said engagement family database comprising methodology descriptions each including one or more engagement models; with at least one engagement model providing an abstract representation of all process and work products needed to build components of said integrated application, separating said work product descriptions from said process descriptions and relating them through an engagement model and an engagement template by a three phase process including:

in a first phase, building a database of said engagement models based on best-of-breed concepts for addressing overall market place requirements, said database of engagement models including method process abstractions specifying how to create application solutions in a variety of scenarios;

in a second phase, developing a definition of client requirements and an approach hypothesis for addressing said client requirements across all possible combinations of technology by selecting from said database an appropriate engagement model for addressing said client requirements and defining a fit parameter; utilizing said engagement model to create said engagement template which addresses requirements of a specific client within said market place including adding, deleting and modifying work product descriptions and process descriptions as required to optimize said fit parameter; and in a third phase, measuring, monitoring and controlling client engagements based upon said engagement template including utilizing said engagement templates to define and collect metrics including risk parameters, cost parameters, and customer satisfaction parameters across a plurality of engagement models for optimizing the defining and estimating of projects, and responsive to said metrics, managing a family of said engagement models, including adjusting market approach plans and allocation of constrained resources responsive to said family of engagement models.

2. The systems integration method of claim 1, said first phase further comprising the steps of:

enabling a generic engagement model for addressing said market place requirements; and generating work product descriptions specified by said engagement model.

3. The systems integration method of claim 2, said generic engagement mode including definitions of best practices and reusable assets.

4. The systems integration method of claim 2, said second phase further including the steps of:

creating an engagement template personalized to a specific client engagement from said engagement model;

creating approach, resource, and deployment plans for said specific client engagement using said engagement template.

5. The systems integration method of claim 4, said third phase further including the step of:

cyclically redefining said engagement template while deploying said work product descriptions and process descriptions to said client engagement.

6. The systems integration method of claim 5, said third phase further including the steps of:

monitoring performance of said client engagement; and based upon said performance, allocating resources to further approach said marketplace requirement.

7. A system for providing integrated system solutions enabling consistency to integrated application solution design and delivery across different engagements with comparable and reusable results, comprising:

a collection of databases on a network accessible via a terminal application a domain database, a work product description database, a method process description database, an engagement model database, an engagement family database, and engagement template database;

said domain database comprising a logical grouping of said work product descriptions, including application, architecture, business, engagement, organization, operations, external assets, and requirements;

said method process description database comprising a set of method process descriptions for describing how each of a plurality of hardware, software, and process components comprising application solutions are to be designed, developed, and implemented; and further phase, activity, and task databases for use in decomposing a development and delivery process into a hierarchy of steps of a default project plan; said phase including a set of activities for a contract with a customer; said activity including a grouping of related tasks for sequencing work effort and managing complexity within a phase; said task being a unit of work estimated and scheduled for producing a work product;

said engagement template database comprising a collection of templates, each template a result of tailoring a specific engagement models for use;

said work product description database comprising a set of work product descriptions for defining a set of said components for each tangible artifact produced and consumed in connection with a specific application solution, each said work product description specifying purpose, description, notation, example, development approach, validation and verification guidelines, advice and guidance, estimating considerations, and references, said descriptions of work products being produced on engagements as a basis for method adoption, method integration, and harvesting and structuring of intellectual capital for application to new market engagement models;

said engagement model database comprising a plurality of template project plans, each for a specific service offering and engagement; said engagement family database comprising methodology descriptions each including one or more engagement models; with at least one engagement model providing an abstract representation of all process and work products needed to build components of said integrated application, each said engagement model collecting at least one said process description and at least one said work product description through a three phase process into a model for implementing a typical project addressing a type of marketplace requirement, said three phase process including in a first phase, building a database of engagement models which will be used to address said market requirement, said database of engagement models including method process abstractions specifying how to create application solutions in a variety of scenarios;

in a second phase, developing a definition of client requirements across all possible combinations of technology and an approach hypothesis for addressing said client requirements by selecting from said database an appropriate engagement model for addressing said client requirements and defining a fit parameter; utilizing said engagement model to create an engagement template which specifically addresses a more specific set of client project requirements within said market place including adding, deleting and modifying work product descriptions and process descriptions with respect to said model and template as required to optimize said fit parameter to client project needs; and in a third phase, measuring, monitoring and controlling client engagements based upon said engagement template including utilizing said engagement templates to define and collect metrics including risk parameters, cost parameters, and customer satisfaction parameters across a plurality of engagement models for optimizing the defining and estimating of projects, and responsive to said metrics, managing a family of said engagement models, including adjusting market approach plans and allocation of constrained resources responsive to said family of engagement models.

8. The system of claim 7, further comprising:
at least one engagement family including a plurality of said engagement models for addressing a family of typical projects.

9. The system of claim 7, further comprising:
a plurality of work product descriptions organized into a plurality of domains, each said domain being a logical grouping of said work product descriptions.

10. The system of claim 9, said domains including an application domain, an architecture domain, a business domain, an engagement domain, an organization domain, and an operations domain.

11. The system of claim 7, said work product descriptions describing what to develop for a specific project and said process description describing how to develop said specific project.

12. The system of claim 11, said process descriptions further comprising phase descriptions, activity descriptions and task descriptions.

13. The system of claim 12, further comprising at least one engagement template derived from one of said engagement models for defining said work product descriptions and said process descriptions for a specific engagement project.

14. The system of claim 10, said application domain organizing work product descriptions relating to the design, development and testing of computer software components, applications and systems.

15. The system of claim 10, said architecture domain organizing work product descriptions relating to the architecture of an information technology system for addressing business and infrastructure requirements.

16. The system of claim 10, said business domain organizing work product descriptions relating to the structured investigation of current and desired situations with a client' business.

17. The system of claim 10, said engagement domain organizing work product descriptions relating to project management and technical delivery for projects worldwide.

18. The system of claim 10, said organization domain organizing work product descriptions relating to technology-based business transformations using systematically defined organization analysis and design and change management practices.

19. The system of claim 10, said operations domain organizing work product descriptions relating to the execution and management of information technology services and resources and to the protection of information technology assets.

20. A program storage device readable by a machine, tangibly embodying a program of instructions executable by a machine to perform method steps for providing systems integration enabling consistency to integrated application solution design and delivery across different engagements with comparable and reusable results, said method steps comprising:

providing a collection of databases on a network accessible via a terminal application a domain database, a work product description database, a method process description database, an engagement model database, an engagement family database, and engagement template database;

said domain database comprising a logical grouping of said work product descriptions, including application, architecture, business, engagement, organization, operations, external assets, and requirements;

said method process description database comprising a set of method process descriptions for describing how each of a plurality of hardware, software, and process components comprising application solutions are to be designed, developed, and implemented; and further phase, activity, and task databases for use in decomposing a development and delivery process into a hierarchy of steps of a default project plan; said phase including a set of activities for a contract with a customer; said activity including a grouping of related tasks for sequencing work effort and managing complexity within a phase; said task being a unit of work estimated and scheduled for producing a work product;

said engagement template database comprising a collection of templates, each template a result of tailoring a specific engagement models for use;

said work product description database comprising a set of work product descriptions for defining a set of said components for each tangible artifact produced and consumed in connection with a specific application solution, each said work product description specifying purpose, description, notation, example, development approach, validation and verification guidelines, advice and guidance, estimating considerations, and references, said descriptions of work products being produced on engagements as a basis for method adoption, method integration, and harvesting and structuring of intellectual capital for application to new market engagement models;

said engagement model database comprising a plurality of template project plans, each for a specific service offering and engagement; said engagement family database comprising methodology descriptions each including one or more engagement models; with at least one engagement model providing an abstract representation of all process and work products needed to build components of said integrated application;

separating said work product descriptions from said process descriptions and relating them through an engagement model and an engagement template by a three phase process including:
- in a first phase, building a database of said engagement models based on best-of-breed concepts for addressing overall market place requirements;
- in a second phase, developing a definition of client requirements and an approach hypothesis for addressing said client requirements by selecting from said database an appropriate engagement model for addressing said client requirements and defining a fit parameter; utilizing said engagement model to create said engagement template which addresses requirements of a specific client within said market place including adding, deleting and modifying work product descriptions and process descriptions as required to optimize said fit parameter; and
- in a third phase, measuring, monitoring and controlling client engagements based upon said engagement template including utilizing said engagement templates to define and collect metrics including risk parameters, cost parameters, and customer satisfaction parameters across a plurality of engagement models, and responsive to said metrics, managing a family of said engagement models, including adjusting market approach plans and allocation of constrained resources responsive to said family of engagement models.

21. An article of manufacture comprising:
a computer useable medium having computer executable program code means embodied therein for providing systems integration, the computer readable program means in said article of manufacture comprising:
  computer readable program code means for providing a collection of databases on a network accessible via a terminal application a domain database, a work product description database, a method process description database, an engagement model database, an engagement family database, and engagement template database; said domain database comprising a logical grouping of said work product descriptions, including application, architecture, business, engagement, organization, operations, external assets, and requirements; said method process description database comprising a set of method process descriptions for describing how each of a plurality of hardware, software, and process components comprising application solutions are to be designed, developed, and implemented; and further phase, activity, and task databases for use in decomposing a development and delivery process into a hierarchy of steps of a default project plan; said phase including a set of activities for a contract with a customer; said activity including a grouping of related tasks for sequencing work effort and managing complexity within a phase; said task being a unit of work estimated and scheduled for producing a work product; said engagement template database comprising a collection of templates, each template a result of tailoring a specific engagement models for use; said work product description database comprising a set of work product descriptions for defining a set of said components for each tangible artifact produced and consumed in connection with a specific application solution, each said work product description specifying purpose, description, notation, example, development approach, validation and verification guidelines, advice and guidance, estimating considerations, and references, said descriptions of work products being produced on engagements as a basis for method adoption, method integration, and harvesting and structuring of intellectual capital for application to new market engagement models; said engagement model database comprising a plurality of template project plans, each for a specific service offering and engagement; said engagement family database comprising methodology descriptions each including one or more engagement models; with at least one engagement model providing an abstract representation of all process and work products needed to build components of said integrated application;
  computer executable program code means for causing a computer to effect providing at least one engagement model collecting at least one said process description and at least one said work product description through a three phase process into a model for implementing a typical project addressing a type of marketplace requirement, said three phase process including
    in a first phase, building a database of engagement models which will be used to address said market requirement;
    in a second phase, developing a definition of client requirements and an approach hypothesis for addressing said client requirements by selecting from said database an appropriate engagement model for addressing said client requirements and defining a fit parameter; utilizing said engagement model to create an engagement template which specifically addresses client requirements within said market place including adding, deleting and modifying work product descriptions and process descriptions as required to optimize said fit parameter; and
    in a third phase, measuring, monitoring and controlling client engagements based upon said engagement template including utilizing said engagement templates to define and collect metrics including risk parameters, cost parameters, and customer satisfaction parameters across a plurality of engagement models, and responsive to said metrics, managing a family of said engagement models, including adjusting market approach plans and allocation of constrained resources responsive to said family of engagement models.

* * * * *

UNITED STATES PATENT AND TRADEMARK OFFICE
CERTIFICATE OF CORRECTION

PATENT NO. : 6,950,802 B1 Page 1 of 1
APPLICATION NO. : 09/625108
DATED : September 27, 2005
INVENTOR(S) : Steven D. Barnes et al.

It is certified that error appears in the above-identified patent and that said Letters Patent is hereby corrected as shown below:

On the Title Page,
Item (74) *Attorney, Agent, or Firm:* William E. Schiesser; Shelly M Beckstrand Item (56) References Cited
U.S. PATENT DOCUMENTS

| | | | |
|---|---|---|---|
| 5,848,394 B1 | 12/1998 | D'Arrigo et al. | 705/8 |
| 5,745,878 B1 | 4/1998 | Hashimoto et al. | 705/1 |
| 5,535,389 B1 | 7/1996 | Elder et al. | 395/700 |
| 6,003,011 B1 | 12/1999 | Sarin et al. | 705/9 |
| 6,023,702 B1 | 2/2000 | Leisten et al. | 707/100 |
| 5,655,086 B1 | 8/1997 | Jury et al. | 395/209 |
| 5,765,140 B1 | 6/1998 | Knudson et al. | 705/9 |
| 5,974,392 B1 | 10/1999 | Endo | 705/8 |
| 6,006,215 B1 | 12/1999 | Retallick | 707/2 |
| 5,611,034 B1 | 3/1997 | Hall | 395/140 |
| 6,009,405 B1 | 12/1999 | Leyman et al. | 705/9 |

\* cited by Examiner

Signed and Sealed this

First Day of August, 2006

JON W. DUDAS
*Director of the United States Patent and Trademark Office*